United States Patent
Yokoyama et al.

(10) Patent No.: US 7,779,721 B2
(45) Date of Patent: Aug. 24, 2010

(54) DRIVING OPERATION INPUT DEVICE

(75) Inventors: Atsushi Yokoyama, Yamato (JP);
Mitsuhide Sasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 937 days.

(21) Appl. No.: 11/628,082

(22) PCT Filed: Jun. 21, 2004

(86) PCT No.: PCT/JP2004/009056

§ 371 (c)(1),
(2), (4) Date: Nov. 30, 2006

(87) PCT Pub. No.: WO2005/124500

PCT Pub. Date: Dec. 29, 2005

(65) Prior Publication Data
US 2007/0245844 A1    Oct. 25, 2007

(51) Int. Cl.
*G05G 1/30* (2008.04)
*G05G 1/40* (2008.04)
(52) U.S. Cl. ............................................. 74/512; 74/560
(58) Field of Classification Search .................. 303/20; 188/151 R, 152, 166, 167; 74/512, 594.1, 74/594.3, 594.4, 513, 560
See application file for complete search history.

(56) References Cited

U.S. PATENT DOCUMENTS

| 2,312,962 | A  | * | 3/1943 | De Florez et al. | ........... 434/244 |
| 6,542,793 | B2 | * | 4/2003 | Kojima et al. | ................... 701/1 |
| 6,916,074 | B2 | * | 7/2005 | Jung et al. | ...................... 303/20 |
| 7,082,853 | B2 | * | 8/2006 | Fujiwara | ...................... 74/512 |
| 7,093,515 | B2 | * | 8/2006 | Yamanoi et al. | .............. 74/512 |
| 2005/0235820 | A1 | * | 10/2005 | Fujiwara et al. | ............ 91/369.2 |

FOREIGN PATENT DOCUMENTS

| JP | 62-32889 U | 2/1987 |
| JP | 1-74926 U | 5/1989 |
| JP | 2002-104153 A | 4/2002 |

OTHER PUBLICATIONS

International Search Report dated Oct. 12, 2004 (Three (3) pages).

* cited by examiner

*Primary Examiner*—Thomas J Williams
(74) *Attorney, Agent, or Firm*—Crowell & Moring, LLP

(57) ABSTRACT

A small and low-energy consuming operation input device enabling the adjustment of an operational reaction, comprising a rigidity adjusting mechanism for adjusting the relation of the displacement amount of an input part to the deformation amount of an elastic body by changing the position of the load acting point on the elastic body.

6 Claims, 4 Drawing Sheets

(a)  (b)

DRIVING OPERATION INPUT DEVICE

TECHNICAL FIELD

The present invention relates to a driving operation input device for automobiles, and more particular, to a driving operation input device for control of vehicular movements.

BACKGROUND ART

Conventionally, there is known a driving operation input device to control an electric force to variably control an operational reaction force. A driving operation input device proposed in JP-A-2002-104 changes a drive torque of an electric motor mounted on a rotating shaft of a brake pedal to thereby electronically control an operational reaction force. Since the driving operation input device can adjust an operational reaction force optionally, it is possible to transmit information about a vehicle to a driver. Also, since the relationship between a movable input part and an operational reaction force can be varied, it is possible to adjust an operational reaction force (operating rigidity) relative to an operating displacement amount.

DISCLOSURE OF THE INVENTION

Conventional driving operation input devices comprise a drive control device such as electric motor, etc., to which electric energy is supplied to generate an electromagnetic force to produce an operational reaction force to a driver. Therefore, in the case where an operational reaction force is to be produced, the drive control device consumes energy at all times. Also, since there is a need for a drive control device, which has output equivalent to a driver's operating force, there is in some cases incurred large-sizing of the device.

It is an object of the invention to provide a driving operation input device, which can adjust an operational reaction force, is small in size and low in energy consumption.

The above object is attained by providing a rigidity adjusting mechanism, which adjusts the relationship of a deformation amount of an elastic body with respect to a displacement amount of a movable input part to enable adjusting a displacement amount relative to an operating force of the movable input part. Thereby, since energy for production of an operational reaction force is not necessary even when an operating rigidity is changed, it becomes possible to realize a driving operation input device, which is small in size and low in energy consumption.

The above object is attained by providing a rigidity adjusting mechanism, which adjusts the relationship of a deformation amount of an elastic body with a displacement amount of a brake pedal to enable adjusting a displacement amount relative to an operating force of the brake pedal. Thereby, since energy for production of an operational reaction force is not necessary even when an operating rigidity is changed, it becomes possible to realize a driving operation input device for braking, which is small in size and low in energy consumption.

The above object is attained by providing a drive device, which adjusts a rigidity adjusting mechanism by means of electronic control. Thereby, since a driver can control the drive device by means of an electric setting device such as button, dial, etc., mountability on a vehicle is improved further than in case of manual adjustment, thus enabling providing a small-sized driving operation input device.

The above object is attained by that a drive force transmitting mechanism arranged between the drive device and the rigidity adjusting mechanism possesses a self-locking function. Thereby, since a restoring force of the elastic body does not impose a load on the drive device when rigidity is not adjusted, it is possible to provide a driving operation input device, which is small in size and low in energy consumption.

The above object is attained by that the rigidity adjusting mechanism performs an adjusting operation so that a displacement amount the elastic body is not varied in an initial position, in which a driver's operating force does not act. Thereby, since a restoring force of the elastic body does not impose a load on the drive device when rigidity is adjusted at the initial position, it is possible to provide a driving operation input device, which is small in size and low in energy consumption.

The above object is attained by that elastic body is composed of a torsion spring, a point of application of a restoring force is changed by eccentrically rotating a cylindrical-shaped support member, which supports the torsion spring, and an operating rigidity of the movable input part is adjusted. Thereby, since an operating range of parts interlocked with rigidity adjustment can be saved, it is possible to provide a small-sized driving operation input device.

The above object is attained by providing an operating force transmitting mechanism with a hydraulic pressure between a movable input part and an elastic body. Thereby, it is possible to provide a driving operation input device, which is small in size and low in energy consumption, for automobiles provided with a hydraulic vehicle control device.

Specifically, the present invention provides a driving operation input device comprising: a driving operation input part, which is displaced by a driver's operating force; an elastic body, which is deformed according to a displacement amount of the driving operation input part to produce a reaction force for the driving operation input part; and a rigidity adjusting mechanism connected to the elastic body to adjust the operating rigidity relationship of a deformation amount of the elastic body with respect to a displacement amount of the driving operation input part.

Also, the present invention provides a driving operation input device comprising: a brake pedal, which is displaced by a driver's operating force; an elastic body, which is deformed according to a displacement amount of the brake pedal to produce a reaction force for the brake pedal; and a rigidity adjusting mechanism connected to the elastic body to adjust an operating rigidity of the elastic body relative to a displacement amount of the brake pedal.

As described above, with the driving operation input device or the brake pedal according to the invention, an operating rigidity can be made variable by a mechanism, which adjusts the relationship between a displacement amount of the driving operation input part and a deformation amount of the elastic body. Since an operational reaction force is produced by the elastic body, an operating reaction force by a motive power generator is not needed. Accordingly, it is possible to provide a driving operation input device, or a brake pedal, which is small in size and low in energy consumption.

A driving operation input device which is an embodiment of the invention comprises: a driving operation input part, which is displaced by a driver's operating force; an elastic body, which is deformed according to a displacement amount of the driving operation input part to produce a reaction force for the driving operation input part; an adjusting part connected to the elastic body to adjust an operating deformation rigidity of a deformation amount of the elastic body relative to a displacement amount of the driving operation input part; a speed reducer, such as worm speed reducer, etc., connected to the adjusting part and having a self-locking function; and an electric motor, which drives the speed reducer. Further, a characteristic setting device, which sets a characteristic for the operating rigidity, is provided, and the rigidity adjusting mechanism includes a drive control device to which a characteristic value set by the characteristic setting device is input and which drives the electric motor.

Also, a driving operation input device which is an embodiment comprises: a driving operation input part, which is displaced by a driver's operating force; an elastic body, which is deformed according to a displacement amount of the driving operation input part to produce a reaction force for the driving operation input part; an adjusting part connected to the elastic body to adjust an operating rigidity of the elastic body relative to a displacement amount of the driving operation input part; a worm speed reducer connected to the adjusting part and having a self-locking function; and an electric motor, which drives the speed reducer, wherein a rigidity adjusting mechanism provided with a vehicle control device, which sets a characteristic for the operating rigidity, includes a drive control device to which a characteristic value set by the vehicle control device is input and which drives the electric motor.

The drive control device has a feature in that the elastic body is not changed in variation at a position of the driving operation input part, at which a driver's operating force does not act.

The rigidity adjusting mechanism can be constructed to comprise an arm connected at one end thereof to the elastic body and at the other end thereof to a worm wheel of the worm speed reducer.

The elastic body is a torsion spring and the rigidity adjusting mechanism can change a point of application of a restoring force of the torsion spring by eccentrically rotationally supporting a cylindrical-shaped support member, which supports the torsion spring, to adjust a reaction force with respect to a displacement amount of the driving operation input part.

The elastic body and the driving operation input part, or a lever interlocked with the brake pedal and the elastic body can be connected to each other by an operating force transmitting mechanism with a hydraulic pressure.

BEST MODE FOR CARRYING OUT THE INVENTION

Embodiment 1

Figure 1:
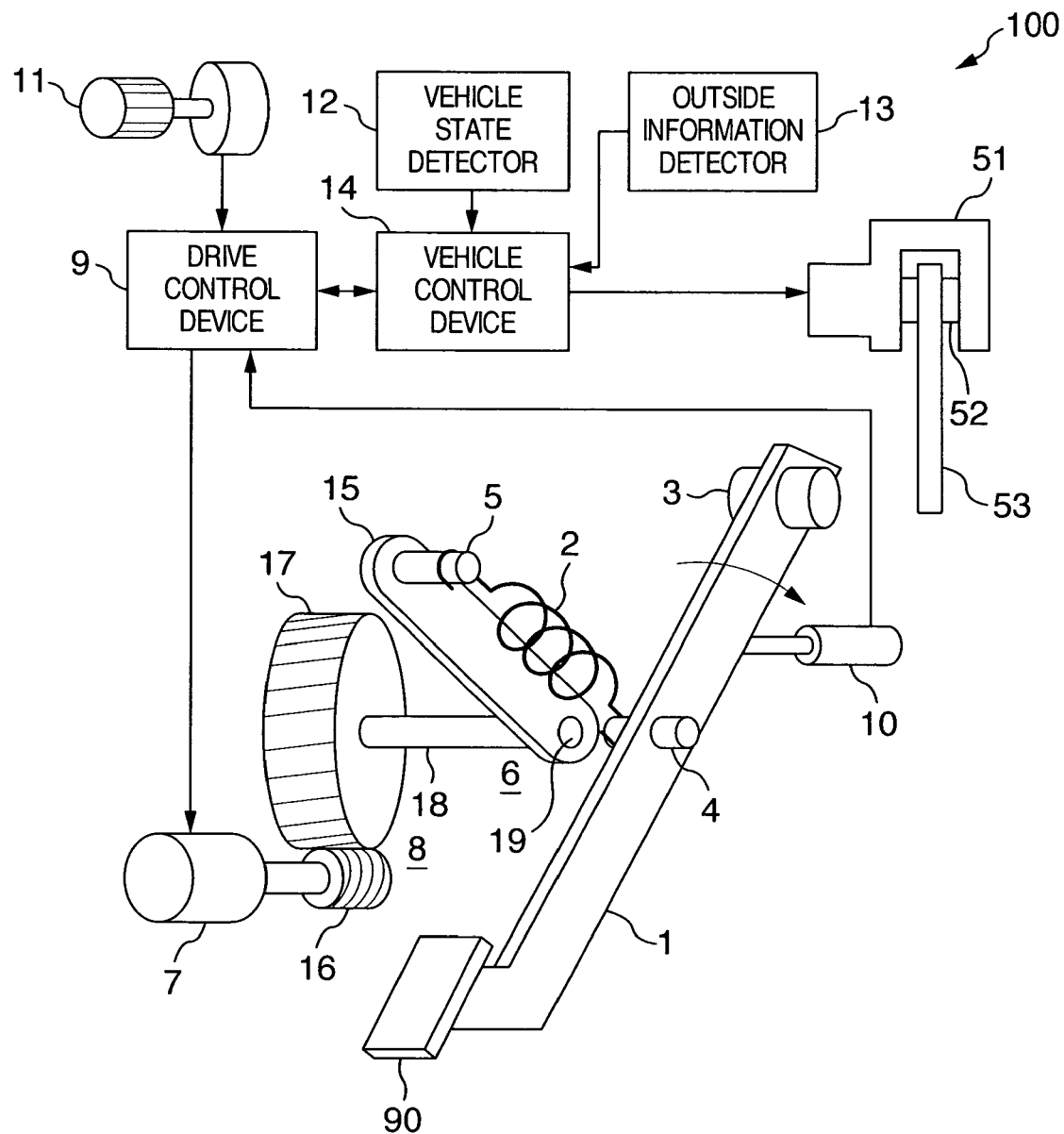
FIG. 1 is a view showing an embodiment of the invention.

FIG. 1 shows a first embodiment of the invention.

A driving operation input device 100 comprises: a movable input lever 1, to which a driver applies an operating force through a brake pedal 90, which is an operation input part when deceleration of a vehicle is needed, the movable input lever interlocking with the brake pedal 90 to be displaced according to the operating force; a coil spring 2 comprising an elastic body, which is deformed according to a displacement amount of the lever 1; a lever support shaft 3 that supports the lever 1 and a vehicle body (not shown) rotationally; a lever side support pin 4 connecting between the lever 1 and the coil spring 2 to makes a point of application of a spring load; a vehicle side support pin 5 supporting the coil spring 2 on an opposite side to the lever side support pin 4 and provided on an arm 15 (adjusting part) to make a point of application of a spring load on a vehicle side; a rigidity adjusting mechanism 6 fixing the vehicle side support pin 5 thereto and functioning to adjust an operating rigidity; an electric motor 7 being a drive source to rotate the rigidity adjusting mechanism 6; a worm speed reducer 8 being a drive force transmitting mechanism to transmit a drive force of the electric motor 7 to the rigidity adjusting mechanism 6; an output shaft 18 of a worm wheel 17; a connection 19 between the output shaft 18 and the arm 15; a drive control device 9 that supplies an electric power to control a drive force; a displacement sensor 10 which is means for detecting displacement of the lever 1; a characteristic setting device 11, with which a driver sets an operational reaction force characteristic of the lever 1; a vehicle state detector 12 that detects an operating state, such as speed, acceleration, etc., of a vehicle; an outside information detector 13 that detects a distance to another vehicle, a surrounding traffic situation, etc.; and a vehicle control device 14 that controls deceleration of a vehicle on the basis of information from the displacement sensor 10, the vehicle state detector 12, etc. In this manner, the coil spring 2 is configured in the case of this example to be fixed and connected to the lever 1 by the lever side support pin 4.

In place of the worm speed reducer 8, the self-locking function can be formed by a speed reducer, which uses a rotation-linear movement mechanism wholly.

An explanation will be given hereinafter to an operation of the driving operation input device constructed in the manner described above.

When a driver does not act any operating force on the lever 1, the lever 1 is held in a state of FIG. 1 by a restoring force of the coil spring 2 (initial position). When deceleration of a vehicle is needed, the driver applies an operating force to the lever 1. The lever 1 is displaced by the driver's operating force in a direction, in which the coil spring 2 is stretched (a right direction, that is, a direction indicated by an arrow in FIG. 1). When the lever 1 is displaced, elongation of the coil spring 2 is increased, so that a force, that is, a restoring force, which returns the lever 1 to the initial position, acts. A load applied on the lever 1 by the restoring force of the coil spring 2 is transmitted as an operational reaction force to the driver. As displacement of the lever 1 increases, elongation of the coil spring 2 increases and a load, with which the coil spring 2 returns the lever 1 to the initial position, increases. The larger an operational reaction force, the higher an operating rigidity with respect to a certain displacement amount of the lever 1.

When the lever 1 is displaced by operation of the driver, a signal corresponding to the displacement amount is fed to the drive control device 9 from the displacement sensor 10. The drive control device 9 calculates a deceleration value requested by the driver on the basis of the signal of the displacement sensor 10. The vehicle control device 14 drives an electronic controlled brake 51 on the basis of a deceleration requested value from the drive control device 9 and information from the vehicle state detector 12 and the outside information detector 13. A frictional force between a brake friction pad 52 and a disk rotor 53 is controlled through driving control of the electronic controlled brake 51, so that deceleration of the vehicle is controlled.

The operating rigidity can be varied by a setting operation of the driver by means of the characteristic setting device 11.

The characteristic setting device 11 comprises, for example, a dial, a volume, a lever, a plurality of buttons, etc. Also, the drive control device 9 can use a control signal generated by the vehicle control device 14 to automatically vary the operating rigidity on the basis of information from the vehicle state detector 12, the outside information detector 13, etc. For example, it is possible to vary the operating rigidity according to a vehicle speed detected by the vehicle state detector 12. Also, in the case where it is desired to inhibit the driver from operating the lever 1, the operating rigidity can be heightened, and in the case where it is desired to urge the driver on operation of the lever 1, the operating rigidity can be set low. Also, when the driver is operating the lever 1, the electric motor 7 can be minutely vibrated to issue a warning to the driver provided that a dangerous running state can be judged based on information from the outside information detector 13, etc. Also, the operating rigidity can be set by inputting a set signal from the characteristic setting device 11 and a control signal from the vehicle control device 14.

Figure 2:
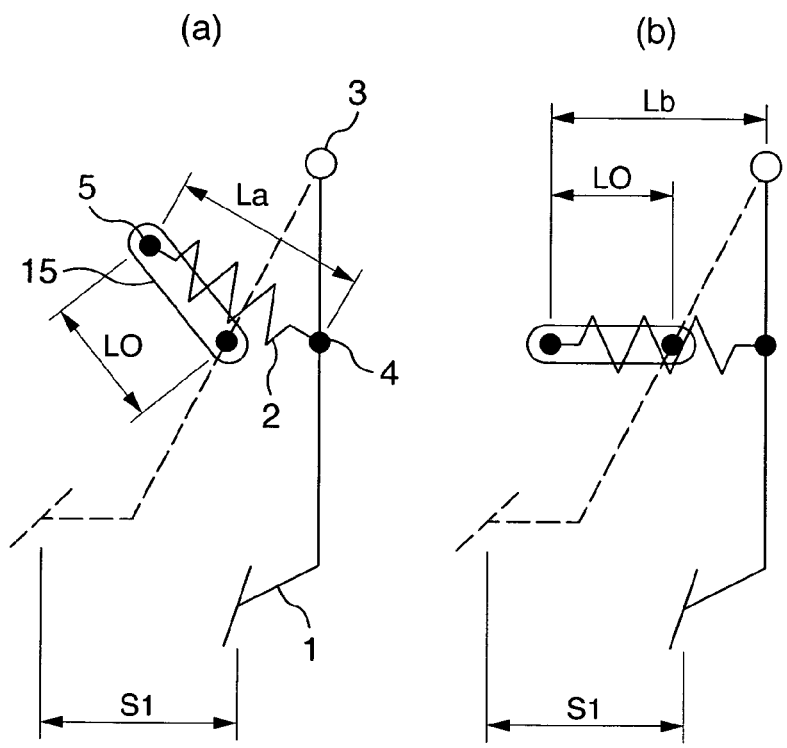
FIG. 2 is a view showing an adjusting operation of the invention.
Figure 3:
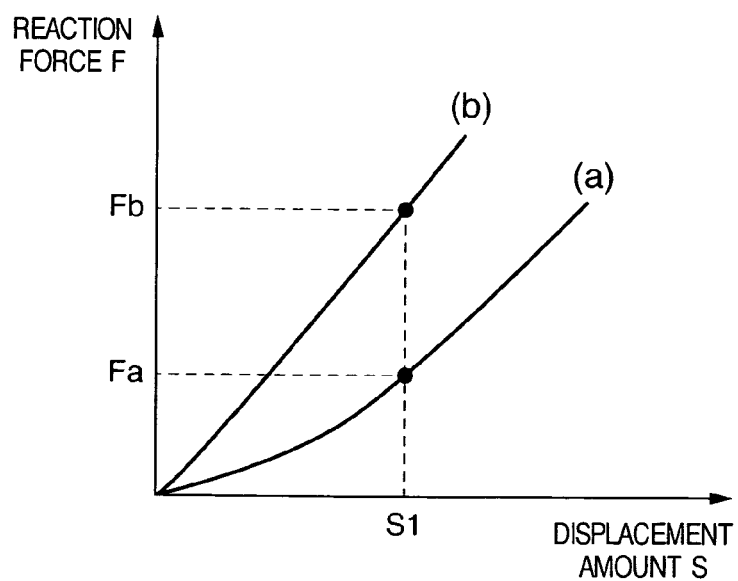
FIG. 3 is a view illustrating an operational reaction force characteristic of the invention.

When the driver uses the characteristic setting device 11 to set the operating rigidity to the lowest state, a position of the arm 15 of the rigidity adjusting mechanism 6 is put in a state shown in FIG. 2(a). When the driver's operating force is absent in this state, the coil spring 2 has a length of L0. When the driver's operating force acts and the lever 1 is displaced a displacement amount S1 as shown in FIG. 2(a), the coil spring 2 has a length of La. At this time, an elongation ΔLa of the coil spring 2 becomes (La−L0). The relationship between a displacement amount S of the lever 1 and an operational reaction force F becomes (a) shown in FIG. 3 and the operational reaction force becomes Fa relative to the displacement amount S1.

When the driver sets the operating rigidity highest, the drive control device 9 having received a signal from the characteristic setting device 11 drives the electric motor 7 to turn the arm 15 of the rigidity adjusting mechanism 6 in a direction toward the driver (left direction in FIG. 1) to hold the same in a state shown in FIG. 2(b). When the driver's operating force is absent in this state, the coil spring 2 has a length of L0. When the driver's operating force acts and the lever 1 is displaced a displacement amount S1 as shown in FIG. 2(b), the coil spring 2 has a length Lb. The elongation ΔLb becomes (Lb−L0). Since ΔLb becomes large as compared with ΔLa, load acting on the lever 1 increases. The relationship between a displacement amount S and an operational reaction force F becomes as indicated by (b) in FIG. 3 and an operational reaction force becomes Fb relative to the displacement amount S1. In comparing (b) in FIG. 3 with (a), a higher operating rigidity can be realized since the operational reaction force Fb is larger than the operational reaction force Fa. In this manner, the provision of the operating rigidity adjusting mechanism 6 capable of adjusting the relationship of a deformation amount of the coil spring 2 with a displacement amount of the lever 1 eliminates a need of generating a drive source such as an electric motor, etc. as a direct reaction force. Accordingly, it is possible to realize a driving operation input device, which is small in size and low in energy consumption. In this manner, the operating rigidity adjusting mechanism to adjust a deformation amount of an elastic body relative to a displacement amount of a driving operation input unit is constructed.

In a state shown in FIG. 2(a), a moment caused by a load of the coil spring 2 acts on the rigidity adjusting mechanism 6. Since the worm speed reducer 8 has a self-locking function to prevent power transmission to a worm gear 16 from a worm wheel 17, however, the electric motor 7 is not required to generate a driving force against the moment caused by the load of the coil spring 2. Accordingly, it is possible to reduce a maximum driving force and a holding energy, which are required for the electric motor 7, thus enabling realizing a driving operation input device, which is small in size and low in energy consumption.

In the initial position, at which a driver's operating force does not act on the lever 1, when adjustment is worked out between a state (FIG. 2(a)), in which an operating rigidity is low, and a state (FIG. 2(b)), in which an operating rigidity is high, a distance between the lever side support pin 4 and the vehicle side support pin 5 is maintained substantially constant. Therefore, even when an operating rigidity is changed in the initial position, elongation of the coil spring 2 is not varied and a small driving load of the electric motor 7 will do. Accordingly, it is possible to reduce a driving force, which is required for the electric motor 7, thus enabling realizing a driving operation input device, which is small in size and low in energy consumption.

Embodiment 2

Figure 4:
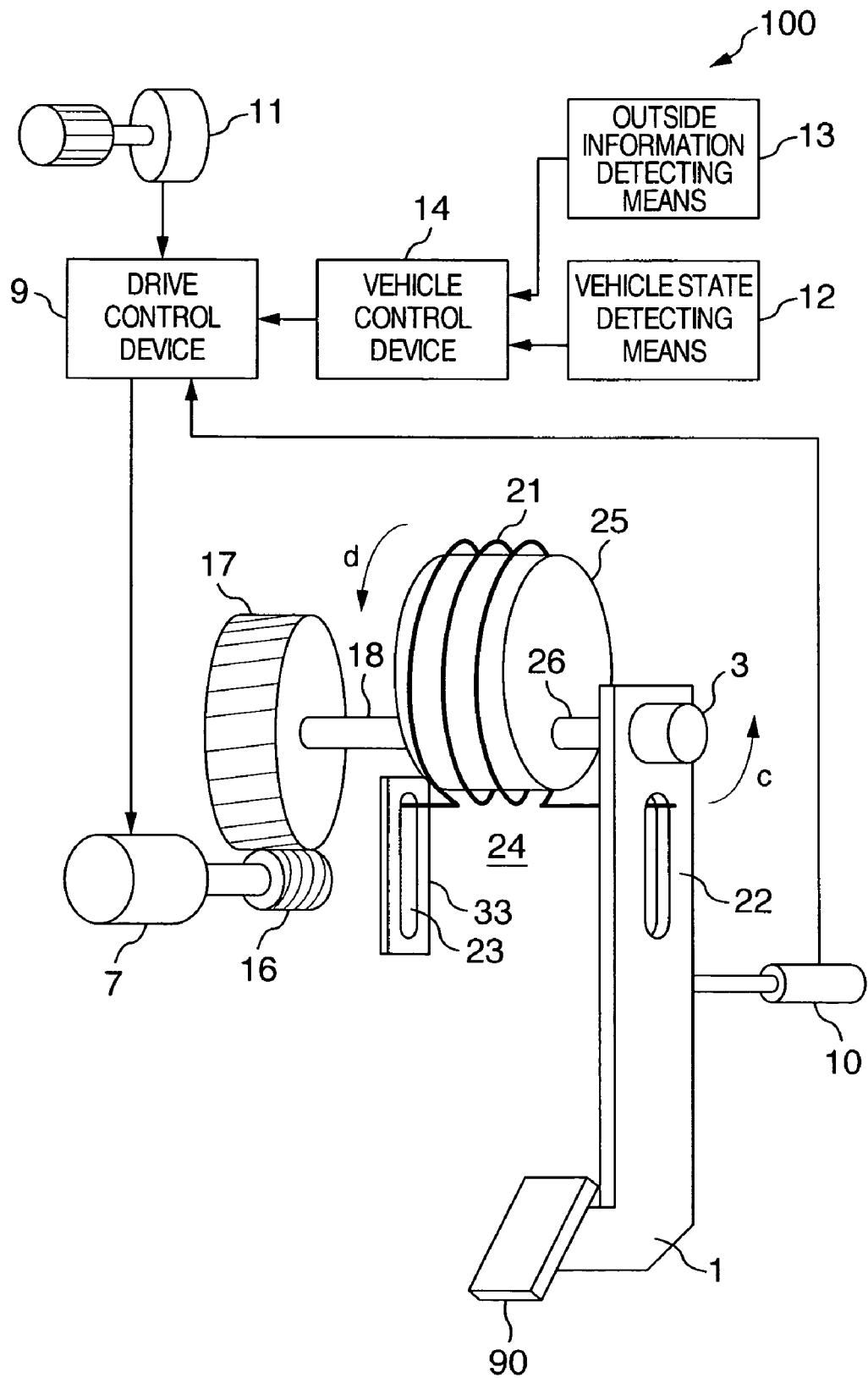
FIG. 4 is a view showing another embodiment of the invention.

FIG. 4 shows a second embodiment of the invention. In addition, an explanation for those elements, which have the same function as that in the first embodiment, is omitted, and the explanation for the first embodiment is referred to.

A driving operation input device according to the second embodiment comprises: a lever 1, which is displaced according to a driver's operating force; a torsion spring 21 composed of elastic body, which is deformed according to a displacement amount of the lever 1; a cylindrical-shaped spring holder 25 (adjusting part), around which the torsion spring 21 is wound with a clearance therebetween and which is turned by a worm speed reducer 8; a lever side support groove 22, which turns together with the lever 1 and serves as a point of application of a spring load on a side of the lever; a vehicle side support groove 23 fixed to a member 33, which is provided on a vehicle body, to serve as a point of application of a spring load on a side of the vehicle body; a rigidity adjusting mechanism 24, which adjusts an operating rigidity relationship; an electric motor 7; a worm speed reducer 8; a drive control device 9; a displacement sensor 10; a characteristic setting device 11; a vehicle state detector 12; an outside information detector 13; and a vehicle control device 14.

The rigidity adjusting mechanism 24 comprises a cylindrical-shaped spring holder 25, an output shaft 18 of a worm wheel and a rotating shaft 26 arranged in an eccentric position relative to a central axis of the spring holder 25. The rotating shaft 26 is arranged in coaxial with the lever support shaft 3. When the spring holder 25 is rotated through the worm speed reducer 8 by a driving force of the electric motor 7, the torsion spring 21 does not rotate together with the spring holder 25 but slides in the support groove with eccentric rotation of the spring holder 25 since it is restricted in rotation by the lever side support groove 22 and the vehicle side support groove 23. In this manner, the torsion spring 21 is configured in this case to be connected indirectly to the lever 1.

When the driver's operating force does not act on the lever 1, the lever 1 is held in a state of FIG. 4 by a restoring force of the torsion spring 21 (initial position). When deceleration of a vehicle is needed, the driver applies an operating force to the lever 1. The lever 1 is rotationally displaced by the driver's operating force in a direction c in FIG. 4. Likewise, the lever side support groove 22 is also rotationally displaced in the direction c in FIG. 4, so that the spring holder 25 is rotationally displaced in a direction d and the torsion spring 21 is elastically deformed. A force tending to return the lever 1 to the initial position is caused by a restoring force of the torsion spring 21 to act and transmitted as an operational reaction force to a driver.

Figure 5:
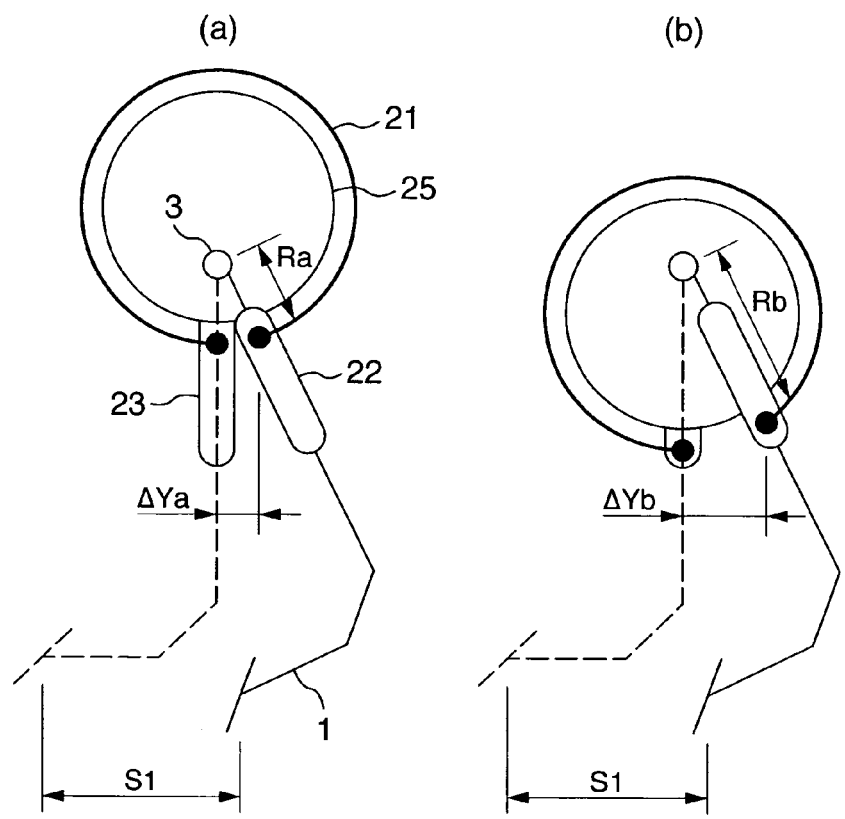
FIG. 5 is a view showing another adjusting operation of the invention.

When the driver sets the characteristic setting device 11 to the lowest operating rigidity, a position of the lever side support groove 22 of the rigidity adjusting mechanism 24 is put in a state shown in FIG. 5(a). In this state, when the lever 1 is displaced a displacement amount S0 as shown in FIG. 5(a), a deformation amount of the torsion spring 21 becomes ΔYa and a distance between the lever support shaft 3 and a point of application of the torsion spring 21 becomes Ra.

When the driver sets a high operating rigidity, the drive control device 9 having received a signal from the characteristic setting device 11 drives the electric motor 7 to turn the lever side support groove 22 of the rigidity adjusting mechanism 24 in a direction (the d direction in FIG. 4) toward the driver to hold the same in a state shown in FIG. 5(b). In this state, when the lever 1 is displaced a displacement amount S0 as shown in FIG. 5(b), a deformation amount of the torsion spring 21 becomes ΔYb and a distance between the lever support shaft 3 and a point of application of the torsion spring 21 becomes Rb. Since ΔYb is large as compared with ΔYa and a radius of the point of application is large as compared with Ra, a moment caused by a restoring force of the torsion spring 21 increases. Accordingly, it is possible to increase an operational reaction force F for the same displacement amount S, thus enabling realizing a high operating rigidity. In this manner, the provision of the operating rigidity adjusting mechanism 24 capable of adjusting the relationship of a deformation amount of the torsion spring 21 with respect to a deformation amount of the lever 1 eliminates a need of generating a drive source such as an electric motor, etc. as a direct reaction force, so that it is possible to realize a driving operation input device, which is small in size and low in energy consumption.

In the initial position, at which the driver's operating force does not act on the lever 1, when a change is made between a state (FIG. 5(a)), in which an operating rigidity is low, and a state (FIG. 5(b)), in which an operating rigidity is high, a distance between both ends of the torsion spring 21 is maintained constant provided that the lever side support groove 22 and the vehicle side support groove 23 are in parallel with each other. Therefore, even when an operating rigidity is changed in the initial position, the torsion spring 21 is not deformed, so that a small load will do when the electric motor 7 is driven. Accordingly, it is possible to reduce a driving force, which is required for the electric motor 7, thus enabling realizing a driving operation input device, which is small in size and low in energy consumption.

Figure 6:
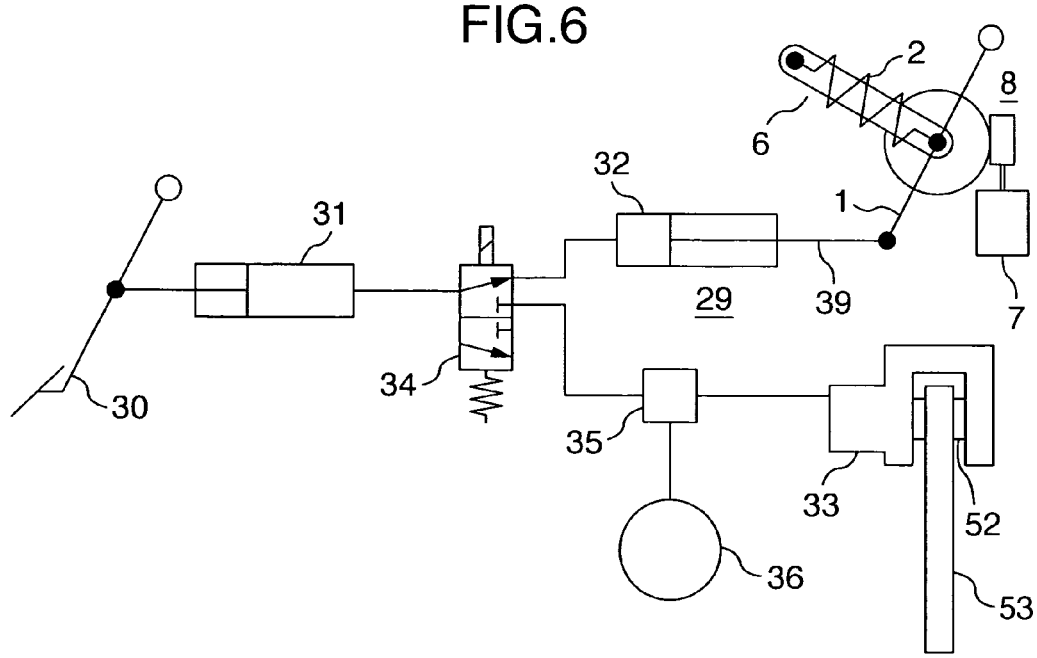
FIG. 6 is a view showing other embodiment of the invention.

While the embodiments have been described with respect to a construction, in which the lever 1 of the variable operation part and the spring 2, 21 are connected to each other by a rigid body, a hydraulic transmission mechanism 29 may be interposed between a variable input part 30 and an elastic body composed of a spring as shown in FIG. 6. A driving operation input device shown in FIG. 6 comprises: a master cylinder 31, in which the variable input part 30 is displaced to compress a hydraulic pressure; a reaction force generating cylinder 32 displaced by a hydraulic pressure from the master cylinder 31; a wheel cylinder 33, which produces a braking force owing to a hydraulic pressure from the master cylinder 31; a hydraulic switching valve 34, which switches a flow passage of a hydraulic pressure of the master cylinder 31 over to either of the reaction force generating cylinder 32 and the wheel cylinder 33; a hydraulic control unit 35, which controls pressure of the wheel cylinder 33 by means of electronic control; and a hydraulic pressure supply source 36, which supplies a hydraulic pressure to the hydraulic control unit 35. A hydraulic pressure of the wheel cylinder 33 produces a frictional force between the brake friction pad 52 and the disk rotor 53, and the frictional force is converted into a braking force on a vehicle.

In the case where electric power is normally supplied to the hydraulic switching valve 34, the hydraulic control unit 35 and the hydraulic pressure supply source 36 and these elements operate normally, the master cylinder 31 and the reaction force generating cylinder 32 are connected to each other by the hydraulic switching valve 34 and a restoring force of the coil spring 2 is transmitted as an operational reaction force to a driver. Also, the hydraulic pressure of the wheel cylinder 33 is controlled by the hydraulic control unit 35 and the hydraulic pressure supply source 36. Accordingly, since a braking force can be produced irrespective of a driver's pedal manipulation, it is possible to finely exercise a braking control according to a state of a vehicle and a surrounding traffic situation. On the other hand, at the time of abnormality when electric power is not supplied to the hydraulic switching valve 34, the hydraulic control unit 35 and the hydraulic pressure supply source 36, the master cylinder 31 and the wheel cylinder 33 are connected to each other by the hydraulic switching valve 34, so that a braking force on a vehicle can be ensured by a driver's operating force.

The reaction force generating cylinder 32 comprises an output rod 39, and the output rod 39 is structured to displace the lever 1. A reaction force of the lever 1 can be variably controlled by the rigidity adjusting mechanism 6. Also, since the hydraulic switching valve 34 is arranged between the variable input part 30 and the lever 1, a driver does not need to deform the coil spring 2 with an operating force in the case where the hydraulic switching valve 34 is switched over to a side of the wheel cylinder at the time of abnormality. Accordingly, the operating force is wholly spent for a braking force, so that it is possible to provide a driving operation input device of high reliability.

Also, while a spring is used as an elastic body in the embodiments described above, it can be readily replaced by a device, which produces a restoring force with deformation in shape. It is conceivable to use, for example, rubber as an elastic body. Also, it is possible to use a device making use of a compressible fluid, or a repulsive force of a magnet. The use of such restoring force makes it possible to provide a driving operation input device, which is improved in mountability according to layout of a vehicle and which is small in size and low in energy consumption.

Also, while adjustment of a deformation amount of an elastic body is achieved by adjusting angles, at which parts are mounted, in the embodiments described above, a construction making use of a speed change mechanism is also conceivable. For example, when a speed change mechanism connects between the variable input part and the elastic body, it is possible to vary a deformation amount of the elastic body relative to displacement of the variable input part. Rigidity can be changed in a further wide range according to a kind of a speed change mechanism.

Also, while the driving operation input device in the embodiments is used as a brake pedal to control deceleration, it may be used as an accelerator pedal to control acceleration. By making an operating rigidity of an accelerator pedal variable, the operating rigidity can be varied according to a magnitude of speed and a driver's preference and a vehicle can be controlled with a further good operability.

Also, while a pedal manipulated by a driver's foot is made variable in rigidity according to the embodiments, use as a mechanism, by which a driving operation input device manipulated by an arm, or a finger is made variable in rigidity, is also possible. Application to a mechanism, in which an elastic body is deformed relative to an operating displacement of a driving operation input device such as handle, lever, dial, slider, torsion bar, etc. and an operational reaction force is produced by a restoring force of the elastic body, is possible. Thereby, control of operation with a further good operability is made possible.

Also, while there is conceived according to the embodiments a construction, in which a mechanical connection is not provided between a brake pedal being a driving operation input device and the electronic controlled brake 51, which produces a force of acceleration and deceleration of a vehicle, a rigidity adjusting mechanism may be mounted on a conventional type construction provided with a hydraulic piping, which connects between a brake pedal and a caliper, and a booster by a negative pressure or a hydraulic pressure. Thereby, it becomes possible to make an operating rigidity of a brake pedal variable without the need of a complex system configuration, which maintains reliability, thus enabling a simple control of a vehicle with good operability.

The invention claimed is:

1. A driving operation input device comprising:
   a driving operation input part, which is displaced by a driver's operating force;
   an elastic body, which is deformed according to a displacement amount of the driving operation input part to produce a reaction force for the driving operation input part;
   an adjusting part connected to the elastic body to vary a deformation amount of the elastic body with respect to a displacement amount of the driving operation input part to adjust an operating rigidity;
   a speed reducer connected to the adjusting part and having a self-locking function; and
   an electric motor, which drives the speed reducer,
   wherein a distance between both ends of the elastic body is maintained constant when the rigidity adjusting mechanism is driven in a state, in which a driver's operating force does not act.

2. A driving operation input device according to claim 1, further comprising a characteristic setting device, which sets a characteristic for the operating rigidity, and wherein the rigidity adjusting mechanism includes a drive control device, to which a characteristic value set by the characteristic setting device is input and which drives the electric motor.

3. A driving operation input device according to claim 1, further comprising a vehicle control device, to which outside information and vehicle state information are input and which sets a characteristic for the operating rigidity, and wherein the rigidity adjusting mechanism includes a drive control device, to which a characteristic value set by the vehicle control device is input and which drives the electric motor.

4. A driving operation input device according to claim 1, wherein the rigidity adjusting mechanism comprises an arm connected at one end thereof to the elastic body and at the other end thereof to a worm wheel of the speed reducer.

5. A driving operation input device comprising:
   a driving operation input part, which is displaced by a driver's operating force;
   an elastic body, which is deformed according to a displacement amount of the driving operation input part to produce a reaction force for the driving operation input part;
   an adjusting part connected to the elastic body to vary a deformation amount of the elastic body with respect to a displacement amount of the driving operation input part to adjust an operating rigidity;
   a speed reducer connected to the adjusting part and having a self-locking function; and
   an electric motor, which drives the speed reducer,
   wherein the elastic body is a torsion spring and the rigidity adjusting mechanism changes a point of application of a restoring force of the torsion spring by eccentrically rotationally supporting a cylindrical-shaped support member, which supports the torsion spring, to adjust a reaction force with respect to a displacement amount of the driving operation input part.

6. A driving operation input device comprising:
   a driving operation input part, which is displaced by a driver's operating force;
   an elastic body, which is deformed according to a displacement amount of the driving operation input part to produce a reaction force for the driving operation input part; and
   a rigidity adjusting mechanism connected to the elastic body to vary a deformation amount of the elastic body with respect to a displacement amount of the driving operation input part to adjust an operating rigidity,
   wherein the elastic body and the driving operation input part, or a lever interlocked with the operation input part and the elastic body are connected to each other by an operating force transmitting mechanism with a hydraulic pressure.

* * * * *